United States Patent [19]

Haartsen

[11] Patent Number: 6,026,297
[45] Date of Patent: Feb. 15, 2000

[54] CONTEMPORANEOUS CONNECTIVITY TO MULTIPLE PICONETS

[75] Inventor: Jacobus Cornelis Haartsen, Borne, Netherlands

[73] Assignee: Telefonaktiebolaget LM Ericsson, Stockholm, Sweden

[21] Appl. No.: 08/932,244

[22] Filed: Sep. 17, 1997

[51] Int. Cl.[7] .................................................. H04M 3/42
[52] U.S. Cl. .......................... 455/426; 455/414; 455/445; 455/552
[58] Field of Search ................................ 455/426, 445, 455/553, 414, 416, 458, 552

[56] References Cited

U.S. PATENT DOCUMENTS

| | | | |
|---|---|---|---|
| 5,117,424 | 5/1992 | Cohen et al. | |
| 5,218,716 | 6/1993 | Comroe et al. | 455/33.4 |
| 5,387,905 | 2/1995 | Grube et al. | 455/56.1 |
| 5,425,049 | 6/1995 | Dent . | |
| 5,481,602 | 1/1996 | Griffiths et al. | 379/210 |
| 5,537,470 | 7/1996 | Lee | 379/266 |
| 5,546,382 | 8/1996 | Fujino . | |
| 5,548,636 | 8/1996 | Bannister et al. | 379/201 |
| 5,617,539 | 4/1997 | Ludwig et al. | |
| 5,627,832 | 5/1997 | Tanaka et al. | |
| 5,633,913 | 5/1997 | Talarmo | 455/458 |
| 5,636,243 | 6/1997 | Tanaka . | |
| 5,664,007 | 9/1997 | Samadi et al. | |
| 5,666,364 | 9/1997 | Pierce et al. | |
| 5,754,627 | 5/1998 | Butler et al. | 455/414 |
| 5,826,173 | 10/1998 | Dent | 455/458 |

FOREIGN PATENT DOCUMENTS

| | | |
|---|---|---|
| 0735789A2 | 10/1996 | European Pat. Off. . |
| WO 96/09731 | 3/1996 | WIPO . |

*Primary Examiner*—Edward F. Urban
*Assistant Examiner*—Thuan T. Nguyen
*Attorney, Agent, or Firm*—Burns, Doane, Swecker & Mathis, L.L.P.

[57] ABSTRACT

A first wireless unit engages in contemporaneous participation in a plurality of wireless networks. A connection is established with a second wireless unit in a first wireless network. Then, a hold time-out period is determined, and the first wireless unit enters a hold mode with respect to the first wireless network. While in hold mode, the first wireless unit establishes a connection with a third wireless unit in a second wireless network. This may include the first wireless unit paging the third wireless unit and acting as a master unit in the second wireless network. Alternatively, the first wireless unit may periodically listen for paging messages from a master unit, and respond when paged, thereby becoming a slave in the second wireless network. The first wireless unit then participates in activities in the second wireless network. Upon expiration of the hold time-out period, the first wireless unit resumes active participation in the first wireless network. This may include determining a second hold time-out period to be used in connection with the second wireless network, and entering a hold mode with respect to the second wireless network.

12 Claims, 4 Drawing Sheets

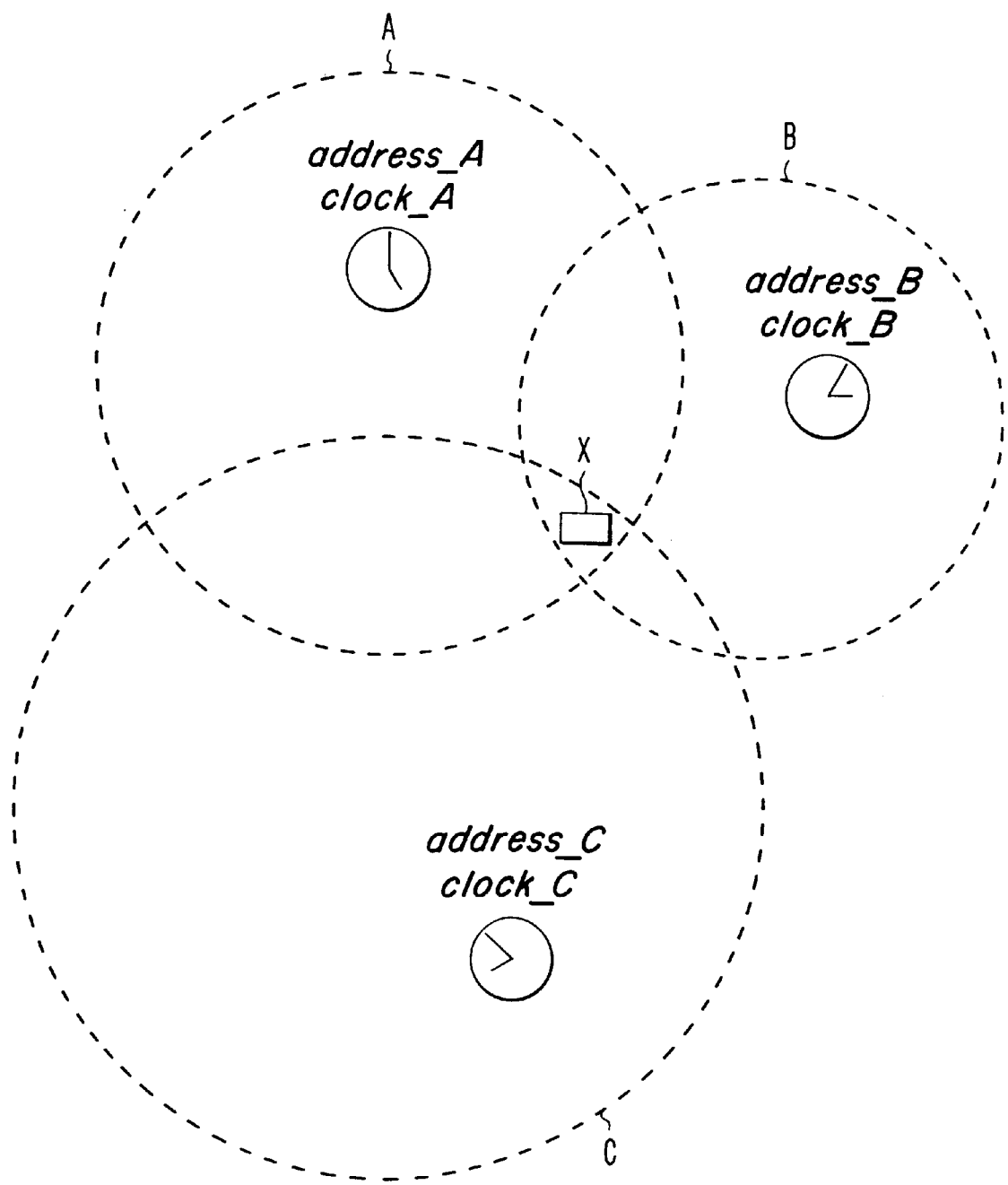

CONTEMPORANEOUS CONNECTIVITY TO MULTIPLE PICONETS

BACKGROUND

The present invention relates to self-organized connectivity in an uncoordinated wireless multi-user system, and more particularly, to techniques for enabling a wireless unit to contemporaneously be a member of multiple independently operating self-organized wireless local area networks.

In U.S. patent application Ser. No. 08/932,911, entitled "Frequency Hopping Piconets in an Uncoordinated Wireless Multi-User System," filed on Sept. 17, 1997 in the name of Haartsen, a system is described that has several uncoordinated piconets co-existing in the same area. This same U.S. Patent application Ser. No. 08/932,911 is hereby incorporated herein by reference.

The piconets together form a network having a scatter topology, in which only those units that indeed want to share information share the same piconet. This topology is illustrated in FIG. 1, in which the network 101 comprises a number of piconets 103-x. Each piconet 103-x comprises a subset of the wireless units 1, . . . , 10. The piconets 103-x are self-organized in the sense that only those wireless units 1, . . . , 10 that want to communicate with each other are in any given piconet 103-x. For example, only units 3 and 4 are in the first piconet 103-1, and only units 1, 5 and 6 are in a third piconet 103-3. The wireless unit 8 is not required to communicate with any of the other units 1, . . . , 7, 9, 10, and is therefore not a member of any of the piconets 103-x.

All piconets make use of the same radio medium. This radio medium however is divided into a large number of subchannels, each centered around a certain carrier frequency. All units in the same piconet synchronously hop from one channel to the next channel. Because different piconets use different pseudo-random hopping sequences, interference immunity is obtained by frequency hopping through a sequence of channels selected in, for example, the 2.4 GHz band. In each piconet, one of the wireless units is designated as a master and the remaining units are slaves. The frequency hopping sequence for each piconet is a function of the master unit's address. The phase within the selected hopping sequence is a function of the master's free-running clock. Information about the master's address and clock is communicated to each slave when a connection between the master and the slave is first established.

When a slave is not engaged in communication, it is preferably in an idle mode. In U.S. patent application Ser. No. 08/771,692, filed Dec. 23, 1996 in the name of Haartsen et al. and entitled "Access Technique of Channel Hopping Communications System," which is hereby incorporated herein by reference, techniques are described for enabling a master to page and thereby "awaken" an idle slave in a frequency hopping system by using the address and clock estimate of the recipient.

In U.S. Pat. No. 5,896,375 entitled "Short-Range Radio Communications System and Method of Use", which issued on Apr. 20, 1999 to Paul W. DENT and Jacobus C. HAARTSEN, which is commonly assigned to the same assignee as that of the present application, and which is hereby incorporated herein by reference, an air-interface is described for this frequency hopping system, optimized to support both voice and data communications. Two units that communicate hop in synchrony. A time division duplex (TDD) scheme is applied to obtain full-duplex communications. The TDD frame comprises a transmit (TX) slot and a receive (RX) slot. For each slot, a different hop frequency is used according to the frequency hopping sequence. Only a single packet can be sent per slot. Different links can co-exist in the same area, each link having its own random hopping sequence. If two links happen to collide, an immediate retransmission of data in the next TDD frame takes place.

The air-interface in the above-referenced U.S. No. 5,896,375 has been optimized for point-to-point configurations. However, limited point-to-multipoint configurations can be established. In this case, a star configuration is used with a master in the center, which is connected to several slaves. Master and slaves are time synchronized, and together perform frequency hopping. That is, the master sends packets in one slot of the TDD frame and all slaves listen. In the next slot, one slave can respond and the master listens. To avoid collisions of transmissions by several slaves simultaneously, a polling scheme is used in which only a slave that is addressed by the master in the master TX slot is allowed to respond in the master RX slot. The master and the slaves form a piconet. As mentioned above, the frequency hopping sequence used in the piconet is determined by the master address, and the phase in the sequence is determined by the master clock. Because all units have free running clocks, the clock in each slave is temporarily adjusted with an offset to provide a clock value identical to the master clock. Because the master addresses and clocks differ in each piconet, each piconet has its own frequency hopping sequence and phase therein. Consequently, several piconets can co-exist in close proximity to one another.

As described in the above-referenced documents, once a master or slave has joined a piconet, there is no provision for enabling it to communicate with another, co-existing piconet. This restriction can detrimentally limit the utility of piconet technology.

SUMMARY

It is therefore an object of the present invention to provide techniques for enabling wireless units to contemporaneously participate in communications taking place in more than one piconet at a time.

The foregoing and other objects are achieved in a method and apparatus for operating a first wireless unit to contemporaneously participate in a plurality of wireless networks. In one aspect of the invention, this may include establishing a connection with a second wireless unit in a first wireless network and, at some point, determining a hold time-out period and entering a hold mode with respect to the first wireless network. Then, the first wireless unit establishes a connection with a third wireless unit in a second wireless network, and participates in activities in the second wireless network. Upon expiration of the hold time-out period, the first wireless unit resumes active participation in the first wireless network.

In another aspect of the invention, the act of resuming active participation in the first wireless network includes determining a second hold time-out period to be used in connection with the second wireless network, and entering a hold mode with respect to the second wireless network. In this way, the strategy is that while a wireless unit is actively participating in one wireless network, it may be on hold in one or more other wireless networks.

In still another aspect of the invention, the act of establishing the connection with the third wireless unit in the second wireless network includes transmitting a paging message that includes an address of the third wireless unit, receiving a response from the third wireless unit, and establishing the connection with the third wireless unit. In this way, the first wireless unit may be a master in the second wireless network.

In yet another aspect of the invention, the act of establishing the connection with the third wireless unit in the second wireless network includes entering a standby mode for a predetermined period of time, and periodically determining whether a paging message has been received that designates the first wireless unit as recipient. If the paging message has been received that designates the first wireless unit as recipient, then the first wireless unit sends a response to the sender of the paging message and establishes a connection with the sender of the paging message. In this way, the first wireless unit may be a slave in the second wireless network.

In still another aspect of the invention, the first wireless unit is a slave in the first wireless network; and the act of determining a hold time-out period includes mutually agreeing upon the hold time-out period with the second wireless unit.

In another aspect of the invention, the first wireless unit may be a master in the first wireless network; and the act of determining a hold time-out period includes mutually agreeing upon a hold time-out period with every slave wireless unit in the first wireless network.

BRIEF DESCRIPTION OF THE DRAWINGS

The objects and advantages of the invention will be understood by reading the following detailed description in conjunction with the drawings in which:

FIG. 2 is a diagram of a wireless unit that contemporaneously participates in piconets in accordance with the invention.

DETAILED DESCRIPTION

Figure 1:
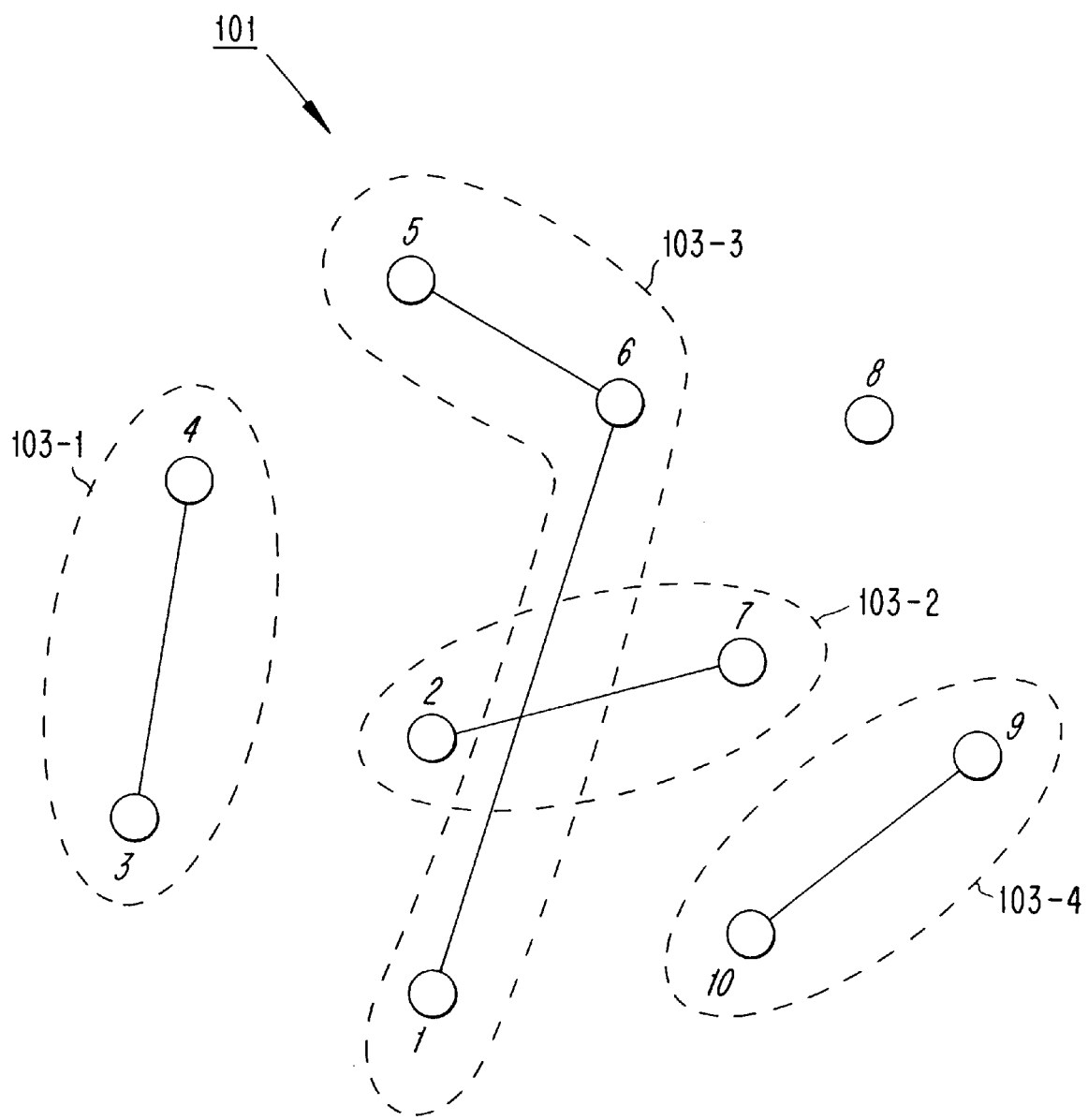
FIG. 1 is a diagram of a wireless network having a scatter topology consisting of several piconets for use with the invention.

The various features of the invention will now be described with respect to the figures, in which like parts are identified with the same reference characters.

The present invention enables wireless units to contemporaneously participate in more than one of a number of co-existing piconets. This is made possible by means of a so-called "hold mode" that can be implemented using the air-interface as described in the above-referenced U.S. Pat. No. 5,896,375. While in hold mode, a link enters a hold state in which the two or more communicating parties keep their clocks running in synchrony, but do not physically exchange packets. After an agreed time-out period, each of the units leaves the hold mode, returns to the active mode and exchanges some data. This exchange of data enables each unit to readjust its clock to counteract clock drifts. If there is no further information to be exchanged, the units can agree on a new time-out period and enter the hold mode again. In this way, the several units do not have to disconnect if there is temporarily no information to be exchanged, nor do they need to transmit idle packets. Thus, a unit in hold mode can reduce its own power consumption while simultaneously avoiding contributing interference to communications taking place between other units.

While a unit in hold mode may remain idle, this is not a requirement. In accordance with one aspect of the invention, a unit in hold mode in a first piconet uses this time to connect to a different (e.g., second) piconet. In the second piconet the unit can act as master or slave, depending on how the piconet was configured. For example, a master going into hold mode in a first piconet can enter a second piconet as a slave unit, using a different address and clock offset (corresponding to the second piconet's master). There is little purpose for a leaving master to enter the second piconet as a master because, in that case, both first and second piconets would be completely synchronized and used the same address. This would be regarded as a single piconet.

A slave unit leaving the first piconet can enter the second piconet as a slave (using the second piconet master's address and clock offset), or as a master, in which case the second piconet's address and clock are the same as that of the unit itself.

In accordance with another aspect of the invention, upon expiration of the time-out period in the first piconet, a unit has to agree on a hold time-out in the second piconet, and then return to the first piconet. In a preferred embodiment, this operation is not time-critical because after a hold mode the awakened master sends repeated packets to the awakened slave, and the slave merely listens. Master and slave will continue to do so until communications are re-established and a new hold time-out has been agreed upon.

In yet another aspect of the invention, the above-described procedure is extended to more than two piconets. In fact, a unit can jump from one piconet to another using the piconet's address and piconet's offset: the offset added to the unit's internal clock renders the piconet's clock.

In addition to the addresses and clock offsets, there is a hold time-out for each piconet, so that the unit knows when to return to a previous piconet. For a master to leave a piconet, it has to put all the slaves into hold mode. When the hold time-out expires, all slaves wake up and listen to hear from the master. They do not transmit anything, but instead keep listening until the master returns and polls one or more slaves.

For a slave to leave a piconet, all that is required is for it to agree with the master on what the hold time-out period will be. If the time-out period has expired, the master might want to poll the slave. If the slave has not yet returned to the piconet, the master may retransmit the packet until the slave has returned and responded. Alternatively, the master may poll a different slave. If the polling of a particular slave fails for too many polls in a row, the slave may be disconnected under the assumption that a link failure may have occurred.

In another aspect of the invention, if a master or slave unit enters a hold mode but does not wish to resume activity in or create another piconet, it may instead remain in a standby state in which it scans for pages. In this case, the unit can be connected as a slave by a master in another piconet. A master can add slaves in its own piconet at any time.

With the procedure as described above, a unit can be virtually connected to many other units in different piconets. The only restriction is that it cannot communicate in all of these piconets simultaneously. The time-out value for the hold periods in other piconets determines how long a unit can dwell in a current piconet.

The above-described techniques will be illustrated by way of example with reference to FIG. 2. Consider three piconets A, B and C, each with its own address (which defines the hopping sequence) and its own clock (which defines the phase in the sequence). Assume that a unit X contemporaneously participates as a slave in all three piconets. In order to do this, the unit X maintains the information shown in the following table:

| Piconet Address | Clock Offset | Master/Slave Status | Timeout Value |
|---|---|---|---|
| address_A | clock_offset_A | MS_A | timeout_A |
| address_B | clock_offset_B | MS_B | timeout_B |
| address_C | clock_offset_B | MS_C | timeout_C |

The first column of the table contains the address of each piconet A, B, C. This address is used to determine the frequency hopping sequence and possibly the packet identifier (preamble). In the second column is a clock offset value which, when added to the internal clock of unit X, yields the master clock for the corresponding piconet. For example: clock_offset_A=clock_A−clock_X. As explained above, the master clock determines the phase in the piconet's frequency hopping sequence and also the timing in the TDD scheme used in the piconet. In a preferred embodiment, unit X's internal clock is free running and is never reset to match any particular master clock value. Instead, a calculation using the unit X's own internal clock and the offset value is always performed in order to derive a present master clock value.

In the third column, a parameter is set that tells unit X whether it is a master or a slave in the corresponding piconet. As explained earlier, the unit X can be a master or slave in any number of piconets. However, if unit X is a master in all of the piconets, then the piconets essentially merge into one piconet, since each will be using the same address and clock values (i.e., those corresponding to "master" unit X).

Listed in the fourth column is the time-out value for the hold mode that unit X agreed upon with the master of the corresponding piconet. All values in the fourth column are adjusted (e.g., decremented) at a fixed rate, for example the frame rate. In the exemplary embodiment, the time-out value of the piconet that unit X is currently participating in is zero or a negative value. When another time-out value approaches zero, unit X can agree with the current master to enter the hold mode and can then jump to the piconet whose time-out value has reached zero. After the jump, the unit X can resume the communications in the new piconet. If there has been some clock drift, unit X can adjust the clock-offset parameter in the table.

In another aspect of the invention, the unit X can then estimate the drift for the next time. Using the absolute difference due to drift and the hold period over which it happened, a gradient can be calculated that can be used to estimate the drift difference after a following hold time.

Figure 3A:
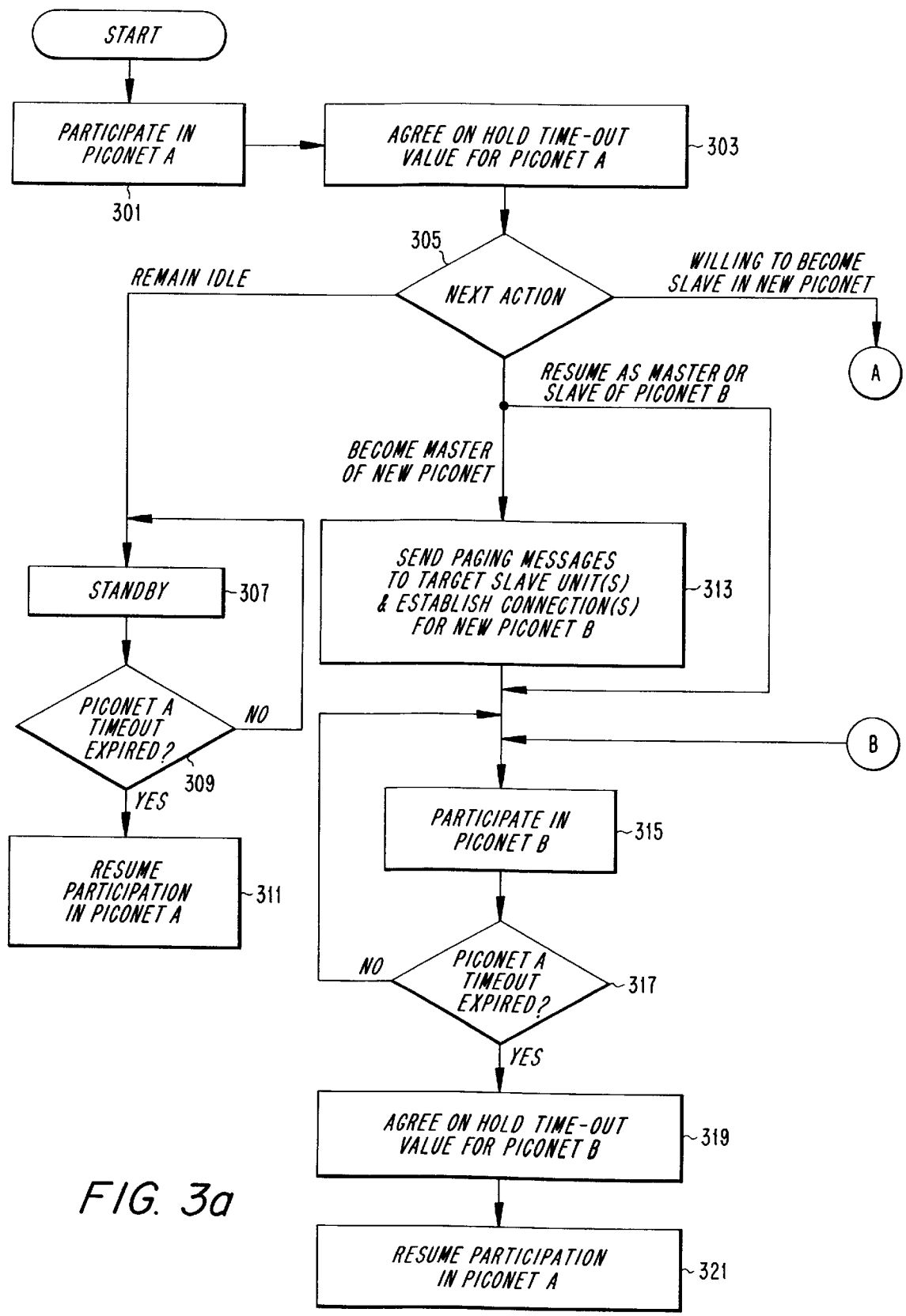
FIGS. 3a and 3b together are a high-level flowchart depicting exemplary operations of a wireless unit in accordance with the invention.
Figure 3B:
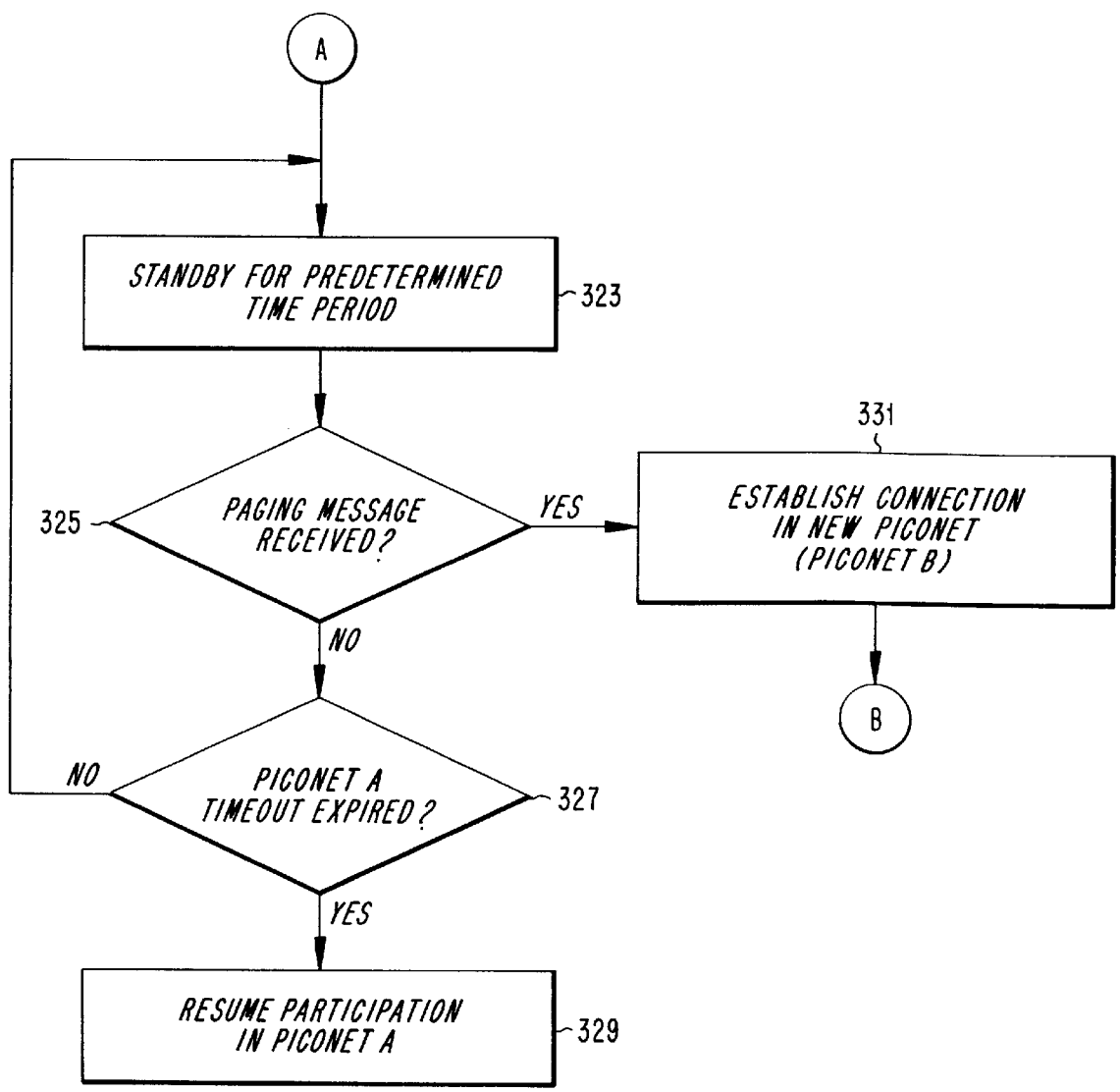

FIGS. 3a and 3b together are a high-level flowchart depicting exemplary operations of a wireless unit in accordance with the invention. In this example, the unit is presumed to be participating in a first piconet, designated piconet A (step 301). At some point, it is decided to enter a hold mode (step 303). If the unit is a master in piconet A, this means agreeing on a hold time-out value with each of the other units that are slaves in piconet A. Alternatively, if the unit is, itself, a slave, then entering a hold mode entails agreeing on a hold time-out value with the master unit of piconet A.

The subsequent operations depend on what the next desired action is (decision block 305). If the unit is to remain idle, then it enters a standby mode (step 307). Periodically, the unit checks to see whether the piconet A time-out period has expired (decision block 309). So long as the time-out period has not expired, the unit re-enters the standby mode ("NO" path out of decision block 309). If the piconet A time-out period has expired ("YES" path out of decision block 309), then the unit leaves the standby mode and resumes its participation in piconet A (step 311).

Alternatively, if the unit is to become a master of a new piconet, then execution branches from decision block 305 to step 313, in which the unit sends paging messages to one or more target slave units, and establishes connections for a new piconet, designated piconet B.

Having established the necessary connections in piconet B, the unit (acting as master) participates in piconet B (step 315). Periodically, the unit must check to see whether the piconet A time-out period has expired (or nearly expired (decision block 317). So long as the piconet A time-out period has not expired ("NO" path out of decision block 317), the unit continues to participate in piconet B (step 315). Upon expiration (or near expiration) of the piconet A time-out period ("YES" path out of decision block 317), the unit comes to an agreement with all of the piconet B slave units as to a hold time-out period for piconet B (step 319). (Alternatively, of course, the unit, acting as master, could simply break all connections with its slave units, thereby disintegrating piconet B.)

After entering a hold mode in piconet B, the unit can then resume participation in piconet A (step 321). The unit must periodically check for expiration of the piconet B time-out period, and switch piconets at an appropriate time.

If, at the time of entering hold mode in piconet A, the unit had already established itself as a master of piconet B, then it may be unnecessary to perform the steps of sending paging messages and establishing connections with slave units in piconet B. Instead, the unit's operation can proceed directly from decision block 305 to step 315, where operations are performed as described above.

In yet another alternative, after entering hold mode in piconet A, the unit may be willing to become a participant in another piconet without, itself, becoming a master. In this case, the unit's operation proceeds from decision block 305 to step 323, in which the unit enters a standby period for a predetermined period of time. Upon expiration of the predetermined period, the unit checks to see whether any paging messages have been received that designate it as the recipient (decision block 325). If the unit has not been paged ("NO" path out of decision block 325), then the unit checks to see whether the piconet A time-out period has expired yet (decision block 327). If the time-out period has not expired ("NO" path out of decision block 327), then operation continues back at step 323, in which standby mode is entered for a predetermined period of time.

If the piconet A time-out period has expired ("YES" path out of decision block 327), then the unit will resume participation in piconet A (step 329). The unit has not become a member of any other piconets at this point, so no other housecleaning steps need to be taken.

If, however, a paging message directed at this unit was received ("YES" path out of decision block 325), then the unit will establish a connection with the master unit that sent the paging message (step 331). Once the connection is established, the unit may then continue execution at step 315 as a participant in piconet B. The remaining steps are as described above.

Referring back again to decision block 305, if, at the time of entering hold mode in piconet A, the unit had already established itself as a slave in piconet B, then it may be unnecessary to perform the steps of monitoring to determine whether a new paging message has been received. Instead, the unit's operation can proceed directly from decision block 305 to step 315, where operations are performed as described above.

The above example has been simplified in order to facilitate an understanding of the invention. Those having ordinary skill in the art will recognize that other scenarios would require modification to the steps shown above. For example, the unit's participation in piconet B could, itself, include entering a hold mode, and optionally becoming a participant in one or more additional piconets (e.g., piconets, C, D, . . . ). This scenario would require, among other things, the inclusion of steps to agree on and subsequently monitor additional time-out periods, one for each piconet in which the unit is a participant in hold mode.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first wireless unit to contemporaneously participate in a plurality of wireless networks, the method comprising the steps of:

establishing a connection with a second wireless unit in a first wireless network;

determining a hold time-out period;

entering a hold mode with respect to the first wireless network;

establishing a connection with a third wireless unit in a second wireless network;

participating in activities in the second wireless network; and upon expiration of the hold time-out period, resuming active participation in the first wireless network.

2. The method of claim 1, wherein the step of resuming active participation in the first wireless network includes the steps of:

determining a second hold time-out period to be used in connection with the second wireless network; and entering a hold mode with respect to the second wireless network.

3. The method of claim 1, wherein the step of establishing the connection with the third wireless unit in the second wireless network includes the steps of:

transmitting a paging message that includes an address of the third wireless unit;

receiving a response from the third wireless unit; and establishing the connection with the third wireless unit, whereby the first wireless unit is a master in the second wireless network.

4. The method of claim 1, wherein the step of establishing the connection with the third wireless unit in the second wireless network includes the steps of:

entering a standby mode for a predetermined period of time;

periodically determining whether a paging message has been received that designates the first wireless unit as recipient; and if the paging message has been received that designates the first wireless unit as recipient, then sending a response to the sender of the paging message and establishing a connection with the sender of the paging message, whereby the first wireless unit is a slave in the second wireless network.

5. The method of claim 1, wherein:

the first wireless unit is a slave in the first wireless network; and the step of determining a hold time-out period includes mutually agreeing upon the hold time-out period with the second wireless unit.

6. The method of claim 1, wherein:

the first wireless unit is a master in the first wireless network; and the step of determining a hold time-out period includes mutually agreeing upon a hold time-out period with every slave wireless unit in the first wireless network.

7. A first wireless unit for contemporaneously participating in a plurality of wireless networks, the first wireless unit comprising:

means for establishing a connection with a second wireless unit in a first wireless network;

means for determining a hold time-out period;

means for entering a hold mode with respect to the first wireless network;

means for establishing a connection with a third wireless unit in a second wireless network;

means for participating in activities in the second wireless network; and means for resuming active participation in the first wireless network upon expiration of the hold time-out period.

8. The first wireless unit of claim 7, wherein the means for resuming active participation in the first wireless network includes:

means for determining a second hold time-out period to be used in connection with the second wireless network; and means for entering a hold mode with respect to the second wireless network.

9. The first wireless unit of claim 7, wherein the means for establishing the connection with the third wireless unit in the second wireless network includes:

means for transmitting a paging message that includes an address of the third wireless unit;

means for receiving a response from the third wireless unit; and means for establishing the connection with the third wireless unit, whereby the first wireless unit is a master in the second wireless network.

10. The first wireless unit of claim 7, wherein the means for establishing the connection with the third wireless unit in the second wireless network includes:

means for entering a standby mode for a predetermined period of time;

means for periodically determining whether a paging message has been received that designates the first wireless unit as recipient; and means for sending a response to the sender of the paging message and establishing a connection with the sender of the paging message if the paging message has been received that designates the first wireless unit as recipient, whereby the first wireless unit is a slave in the second wireless network.

11. The first wireless unit of claim 7, wherein:

the first wireless unit is a slave in the first wireless network; and the means for determining a hold time-out period includes means for mutually agreeing upon the hold time-out period with the second wireless unit.

12. The first wireless unit of claim 7, wherein:

the first wireless unit is a master in the first wireless network; and the means for determining a hold time-out period includes means for mutually agreeing upon a hold time-out period with every slave wireless unit in the first wireless network.

* * * * *